United States Patent
Rolison et al.

(10) Patent No.: US 9,802,254 B2
(45) Date of Patent: Oct. 31, 2017

(54) ZINC ELECTRODES FOR BATTERIES

(71) Applicants: Debra R. Rolison, Arlington, VA (US); Joseph F. Parker, Washington, DC (US); Jeffrey W. Long, Alexandria, VA (US)

(72) Inventors: Debra R. Rolison, Arlington, VA (US); Joseph F. Parker, Washington, DC (US); Jeffrey W. Long, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 489 days.

(21) Appl. No.: 14/501,629

(22) Filed: Sep. 30, 2014

(65) Prior Publication Data
US 2016/0093890 A1   Mar. 31, 2016

(51) Int. Cl.
*H01M 4/86* (2006.01)
*H01M 4/88* (2006.01)
(Continued)

(52) U.S. Cl.
CPC ...... *B22F 7/04* (2013.01); *B22F 3/11* (2013.01); *B22F 7/002* (2013.01); *B22F 7/008* (2013.01); *C25C 1/16* (2013.01); *C25C 5/00* (2013.01); *C25C 5/02* (2013.01); *H01M 4/0471* (2013.01); *H01M 4/244* (2013.01); *H01M 4/26* (2013.01); *H01M 12/08* (2013.01);
(Continued)

(58) Field of Classification Search
None
See application file for complete search history.

(56) References Cited

U.S. PATENT DOCUMENTS 2,640,864 A   6/1953   Fischbach et al.
3,086,068 A   4/1963   Charland et al.
(Continued)

FOREIGN PATENT DOCUMENTS

EP   0484605 A1   5/1992
EP   0878857 A1   11/1998
(Continued)

OTHER PUBLICATIONS

Aurian-Blajeni et al., "Passive Zinc Electrodes: Application of the Effective Medium Theory" J. Electrochem. Soc. 1985, 869-870.
(Continued)

*Primary Examiner* — Sarah A Slifka
*Assistant Examiner* — Haroon S Sheikh
(74) *Attorney, Agent, or Firm* — US Naval Research Laboratory; Joseph T. Grunkemeyer (57) ABSTRACT

A method of: providing an emulsion having a zinc powder and a liquid phase; drying the emulsion to form a sponge; sintering the sponge in an inert atmosphere to form a sintered sponge; heating the sintered sponge in an oxidizing atmosphere to form an oxidized sponge having zinc oxide on the surface of the oxidized sponge; and heating the oxidized sponge in an inert atmosphere at above the melting point of the zinc. A method of: providing an emulsion comprising a zinc powder and a liquid phase; placing the emulsion into a mold, wherein the emulsion is in contact with a metal substrate; and drying the emulsion to form a sponge.

22 Claims, 8 Drawing Sheets (51) Int. Cl.

| | | |
|---|---|---|
| *B22F 7/04* | (2006.01) | |
| *B22F 3/11* | (2006.01) | |
| *H01M 4/04* | (2006.01) | |
| *H01M 4/24* | (2006.01) | |
| *H01M 4/26* | (2006.01) | |
| *H01M 12/08* | (2006.01) | |
| *B22F 7/00* | (2006.01) | |
| *C25C 5/00* | (2006.01) | |
| *C25C 1/16* | (2006.01) | |
| *C25C 5/02* | (2006.01) | |
| *H01M 4/62* | (2006.01) | |
| *H01M 12/06* | (2006.01) | |
| *H01M 4/02* | (2006.01) | |

(52) U.S. Cl.
CPC ....... *B22F 2998/10* (2013.01); *B22F 2999/00* (2013.01); *H01M 4/628* (2013.01); *H01M 12/065* (2013.01); *H01M 2004/021* (2013.01); *H01M 2004/027* (2013.01); *Y02E 60/128* (2013.01)

(56) References Cited

U.S. PATENT DOCUMENTS

| | | | |
|---|---|---|---|
| 3,287,166 A | | 11/1966 | Arrance |
| 3,384,482 A | | 5/1968 | Kelly et al. |
| 3,625,765 A | | 12/1971 | Arrance et al. |
| 3,669,754 A | * | 6/1972 | Ralston .............. H01M 4/02 264/112 |
| 3,972,729 A | | 8/1976 | Mosetti et al. |
| 4,582,766 A | | 4/1986 | Isenberg et al. |
| 4,842,963 A | | 6/1989 | Ross, Jr. |
| 5,011,529 A | * | 4/1991 | Hogue .............. C23C 8/10 419/19 |
| 5,240,793 A | | 8/1993 | Glaeser |
| 5,780,186 A | | 7/1998 | Casey, Jr. |
| 6,558,848 B1 | | 5/2003 | Kobayashi et al. |
| 7,291,186 B2 | | 11/2007 | Zhang |
| 8,039,150 B2 | | 10/2011 | Burchardt et al. |
| 2001/0003641 A1 | | 6/2001 | Kunitomo et al. |
| 2005/0003271 A1 | | 1/2005 | Jiang et al. |
| 2006/0273005 A1 | * | 12/2006 | Love .............. B01D 39/2034 210/510.1 |
| 2006/0292777 A1 | | 12/2006 | Dunbar |
| 2008/0061693 A1 | | 3/2008 | Lee et al. |
| 2008/0106853 A1 | * | 5/2008 | Suenaga .............. B01D 39/2034 361/529 |
| 2008/0254364 A1 | | 10/2008 | Sumihiro et al. |
| 2009/0233159 A1 | * | 9/2009 | Phillips .............. H01M 10/30 429/82 |
| 2009/0311598 A1 | | 12/2009 | Tadano |
| 2010/0092857 A1 | | 4/2010 | Phillips et al. |
| 2010/0221136 A1 | | 9/2010 | Maffia |
| 2011/0155662 A1 | * | 6/2011 | Liu .............. B01D 39/2051 210/510.1 |
| 2012/0052376 A1 | | 3/2012 | Zhang et al. |
| 2013/0089769 A1 | | 4/2013 | Proctor et al. |
| 2014/0147757 A1 | | 5/2014 | Rolison et al. |

FOREIGN PATENT DOCUMENTS

| | | |
|---|---|---|
| WO | 00/55931 A1 | 9/2000 |
| WO | 2006/111835 A1 | 10/2006 |

OTHER PUBLICATIONS

Cai et al., "Spectroelectrochemical Studies on Dissolution and Passivation of Zinc Electrodes in Alkaline Solutions" J. Electrochem. Soc., vol. 143, No. 7, Jul. 1996.
Drillet et al., "Development of a Novel Zinc/Air Fuel Cell with a Zn Foam Anode, a PVA/KOH Membrane and a MnO2/SiOC-Based Air Cathode" ECS Trans. 2010, vol. 28, Issue 32, pp. 13-24.
Lee et al., "Novel alloys to improve the electrochemical behavior of zinc anodes for zinc/air battery" Journal of Power Sources 160 (2006) 1436-1441.
Lee et al., "Novel electrochemical behavior of zinc anodes in zinc/air batteries in the presence of additives" Journal of Power Sources 159 (2006) 1474-1477.
Park et al., "Electrochemical Impedance Spectroscopy and Voltammetry of Zinc in Dilute Alkaline Solutions" Analytical Sciences vol. 13 Supplement 1997, 311-316.
Toussaint et al., "Development of a rechargeable zinc-air battery" ECS Transactions, 28 (32) 25-34 (2010).
Zhang, "Novel Anode for High Power Zinc-Air Batteries" ECS Transactions, 3 (42) 1-11 (2008).
Search Report and Written Opinion in PCT/US2103/071155 (dated Mar. 13, 2014).
Office Action in EP13857994.1 (dated Mar. 16, 2016).
Office Action in U.S. Appl. No. 13/832,576 (dated May 18, 2016).
Office Action in CN201380061984.8 (dated Aug. 16, 2016).
Office Action in CN201380061984.8 (dated Apr. 21, 2017).
Office Action in U.S. Appl. No. 13/832,576 (dated Jan. 15, 2015).
Office Action in U.S. Appl. No. 13/832,576 (dated Jun. 4, 2015).
Office Action in U.S. Appl. No. 13/832,576 (dated Dec. 7, 2016).

* cited by examiner

ZINC ELECTRODES FOR BATTERIES

TECHNICAL FIELD

The present disclosure is generally related to porous zinc electrodes for use in batteries and other uses.

DESCRIPTION OF RELATED ART

The ongoing effort to fulfill the exigencies of ever-growing energy markets, including electric vehicles and portable electronic devices, has led to the investigation of battery technologies that promise to overcome some of the pitfalls of Li-ion batteries. While Li-ion batteries have the benefits of low self-discharge, no memory effect, and above all, rechargeability, the broader application of Li-ion-based energy storage is limited by safety concerns, manufacturing costs, and lower specific energy densities (<200 W h kg$^{-1}$) relative to other promising battery technologies (Lee et al., "Metal-air batteries with high energy density: Li-air versus Zn-air" *Adv. Energy Mater.* 2011, 1, 34-50). Zinc-air batteries, for example, have high practical specific energy densities (400 W h kg$^{-1}$) and the advantage of a cheap and environmentally friendly active material (zinc) coupled to air-breathing cathodes that consume molecular oxygen, which does not need to be stored within the battery (Neburchilov et al., "A review on air cathodes for zinc-air fuel cells" *J. Power Sources* 2010, 195, 1271-1291). While successful as a primary battery in certain commercial applications (e.g., the hearing-aid market), further utility of zinc-air is hindered by its limited rechargeability, lack of pulse power, and moderate utilization of theoretical discharge capacity (<60%). These limitations are inherent to the electrochemical behavior of zinc (Zn) in the traditional anode form-factors that are used in commercial zinc-air batteries.

When discharging a zinc-air battery containing zinc powder mixed with a gelling agent, electrolyte, and binders as the negative electrode, the metallic zinc is oxidized and reacts with the hydroxide ions of the electrolyte to form soluble zincate ions. The dissolved zincate ion diffuses from its point of electrogeneration until it reaches supersaturation conditions, and rapidly precipitates and dehydrates to form semiconducting zinc oxide (ZnO) (Cai et al., "Spectroelectrochemical studies on dissolution and passivation of zinc electrodes in alkaline solutions" *J. Electrochem. Soc.* 1996, 143, 2125-2131). Upon electrochemical recharge, the resultant zinc oxide is reduced back to zinc metal, albeit with a shape differing from the initial discharge. With increasing numbers of discharge-charge cycles, this shape change becomes more pronounced, eventually causing dendrites to grow from the negative electrode until they pierce the separator and cause electrical shorts that end battery operation.

BRIEF SUMMARY

Disclosed herein is a method comprising: providing an emulsion comprising a zinc powder and a liquid phase; drying the emulsion to form a sponge; sintering the sponge in an inert atmosphere to form a sintered sponge; heating the sintered sponge to form an oxidized sponge comprising zinc oxide on the surface of the oxidized sponge; and heating the oxidized sponge in an inert atmosphere at above the melting point of the zinc.

Also disclosed herein is a method comprising: providing an emulsion comprising a zinc powder and a liquid phase; placing the emulsion into a mold, wherein the emulsion is in contact with a metal substrate; and drying the emulsion to form a sponge.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The fundamental requirements for zinc-containing secondary batteries are two-fold. In the case of zinc-air, the air-breathing cathode structure must contain catalysts for both the oxygen reduction reaction (ORR) for battery discharge and the oxygen evolution reaction (OER) for the reverse reaction upon recharge. The zinc anode composite requires either dendrite-inhibiting additives or its architecture must be designed so that the current density is uniformly distributed throughout the zinc structure, thereby decreasing the likelihood of dendrite formation and eventual shorting of the battery. This disclosure focuses on this re-design of zinc architectures to study the application for these zinc sponges to be used for secondary zinc-containing battery systems.

Disclosed herein is an approach to replace powdered-bed zinc anodes with highly porous, monolithic, and 3D through-connected zinc sponges as negative electrodes for use in current and to-be-developed high-performance zinc-containing batteries. In general, the zinc sponges are fabricated by forming a slurry of zinc powder in a two-phase mixture in the presence of emulsion stabilizers to produce highly viscous, yet pourable mixtures that are dried in molds and subsequently thermally treated to yield robust monolithic electrodes. The zinc sponges may exhibit high surface areas due to the interconnected pore network (sized at 10-75 µm), which may lead to an increase in achievable power density relative to commercial zinc-containing batteries. After an electrochemical reduction step, the device-ready electrode is interconnected in 3D, highly conductive, highly porous, infiltrated with electrolyte, structurally sound, and provides an ideal platform for use in rechargeable batteries that use zinc anodes or for primary batteries in which higher utilization of zinc is desired. The fully metallic sponge network provides an electronic environment of improved current distribution, thereby inhibiting the formation of dendrites that lead to electrical shorting. Preliminary characterization of the zinc sponge anode in flooded half-cell configurations is shown, as well as evaluations in full cell zinc-air battery prototypes, and demonstration of rechargeability without deleterious dendrite formation.

Fully metallic, highly conductive pathways in 3D that allow for improved current distribution throughout the electrode structure precludes the discharge-charge cycles from having uneven reaction loci and high local current densities which spur formation of dendrites (Zhang, "Electrochemical thermodynamics and kinetics," *Corrosion and Electrochemistry of Zinc*. 1996, 1$^{st}$ Ed.; Arora et al., "Battery separators" *Chem. Rev.* 2004, 104, 4419-4462). In addition, a highly porous network of zinc allows for confined volume elements with high surface-to-electrolyte volume with faster concomitant saturation of zincate upon discharge and more rapid dehydration to ZnO, thereby minimizing shape change.

The electrode contains two bicontinuous interpenetrating networks. One is solid and comprises zinc and the other is void space. Thus the electrode is a porous zinc structure that may be in the form commonly referred to as a sponge. The zinc network may contain zinc on both the surfaces and the interior of the network. That is, it is not zinc coated onto a non-zinc porous substrate, and it may be pure or nearly pure zinc throughout. The zinc network may also comprise zinc oxide and/or zinc oxyhydroxides that form on the surface when the electrode is discharged in a cell. The zinc network is a fused, monolithic structure in three dimensions. The structure would not be made by merely pressing together zinc particles. Such a pressed material would not have the zinc particles fused together as the pressed particles could be separated from each other. The zinc network may have less than 5 wt. % zinc oxide or even less than 1 wt. %. A lower percentage of zinc oxide may result in better performance of the electrode, however since zinc can spontaneously oxidize in air, it may not be possible for the electrode to be completely zinc oxide-free.

As used herein, the void space refers to the volume within the structure that is not the zinc network nor any other material attached thereto. The void space may be filled with a gas or liquid, such as an electrolyte, and still be referred to as void space.

An example method for making the electrode begins with providing an emulsion of a zinc powder in a liquid phase. Any particle size of the zinc powder may be used, including but not limited to, 100 µm or less. Smaller particle sizes may result in better electrode performance. The liquid phase of the emulsion may be any liquid or mixtures thereof that can be evaporated and in which the zinc powder can be emulsified. A mixture of water and decane is one suitable liquid phase. The emulsification may be improved by the addition of an emulsifier and/or an emulsion stabilizer. One suitable emulsifier is sodium dodecyl sulfate and one suitable emulsion stabilizer is carboxymethylcellulose. Other such suitable emulsifiers and emulsion stabilizers are known in the art. The zinc metal may be alloyed with indium and bismuth or other dopants or emulsion additives that suppress gas evolution and corrosion of the sponge, which may improve performance of the electrode.

The emulsion is introduced into a container that defines the desired size and shape of the resulting Zn/ZnO monolith, and then dried to remove the liquid component. The dried emulsion yields a porous solid object comprising Zn/ZnO particles and void, herein designated as a "sponge"; this porous object may be fragile because the zinc powder particles are not fused together.

Figure 7:
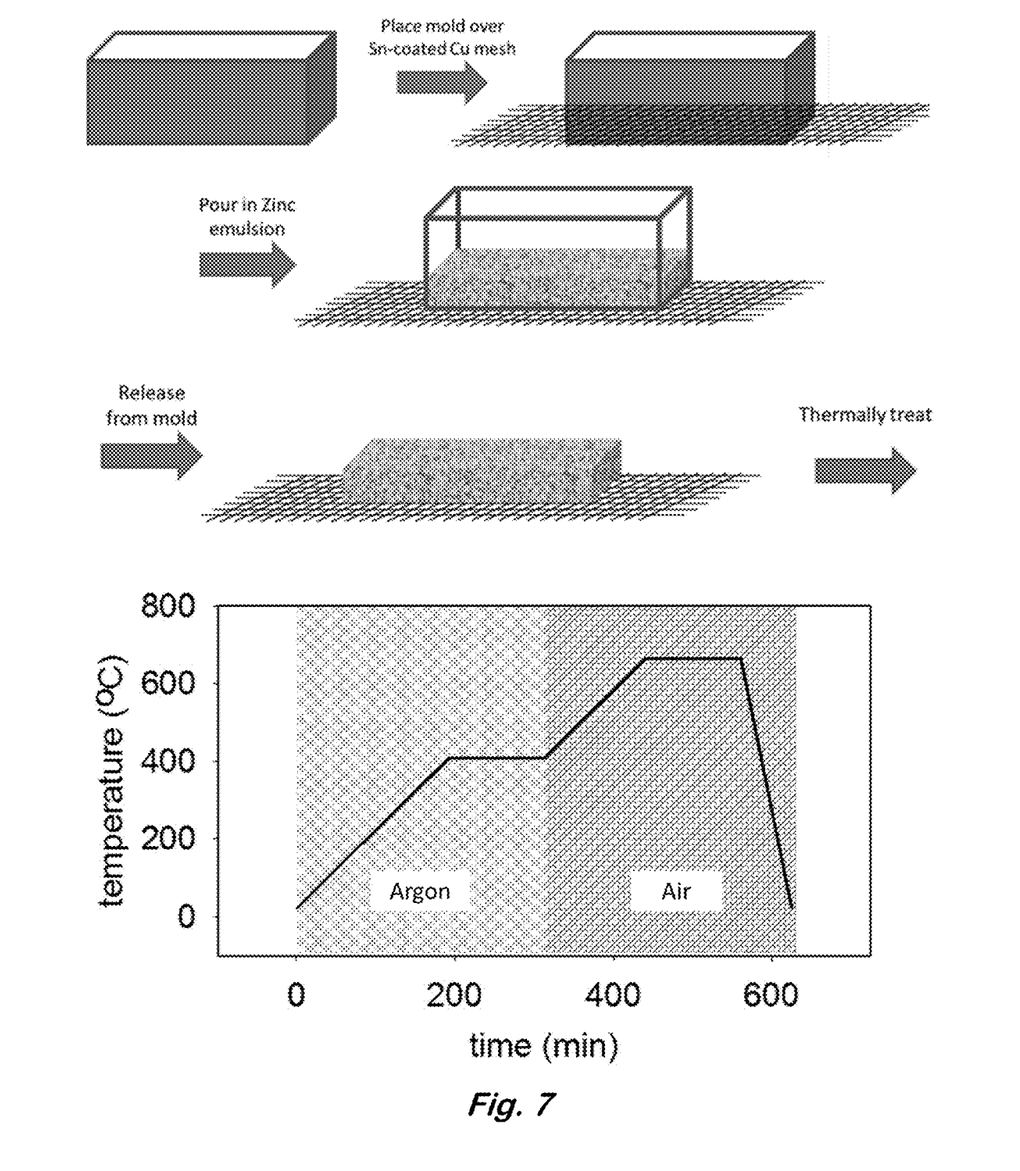
FIG. 7 shows an illustration exemplifying a mold with a base comprising tin or a tin-coated metal capable of producing 3D zinc sponge electrodes that are fused and electronically connected to the tin or a tin-coated metal.

The mold may comprise a metal substrate, mesh, or foil (such as tin) or an alloyed substrate, mesh, or foil (such as tin-coated copper) capable of sustaining the temperatures reached in subsequent thermal treatment steps. This protocol yields electrodes that are metallically fused to another metal. Applications for this protocol include, but are not limited to, electronically connecting the sponge electrode to a current collector to be used in an electrochemical cell, such as a battery. This procedure is shown in FIG. 7, where the base of the mold is open and is placed over a metal mesh (tin-coated copper) with a mesh size through which the zinc particles cannot pass and comprising metals capable of sustaining the temperatures reached in (bottom) subsequent thermal treatment steps. The mesh may have an average opening size that is less than the $d_{50}$ particle size of the zinc powder.

Next the sponge is sintered under a low partial pressure of oxygen to form a sintered sponge. Such conditions may be found either in an inert atmosphere (examples could include argon or nitrogen flow) or under vacuum, all of which contain a trace amount of oxygen. The sintering is performed at temperature below the melting point of zinc and may be at least two thirds of the melting point of zinc. The temperature ramp may be, for example, 2° C./min, and the dwell time may be for example, at least 30 minutes. The sintering fuses the zinc particles into a monolithic structure without causing enough melting to significantly change the overall morphology. The structure remains a sponge. Any sintering conditions that fuse the zinc particles together may be used. Example conditions include, but are not limited to, sintering in argon at a peak temperature of 200 to 410° C. The fused structure contains metallic zinc with interconnecting bridges fusing the particles together.

Next, the sintered sponge is heated in an oxidizing atmosphere to produce zinc oxide on the surface of a partially oxidized sponge. The heating is done at a temperature above the melting point of zinc. This second heating step can improve the strength of the sponge for further handling, such as incorporation into a battery or other device. Since the zinc oxide does not melt and decomposes at a much higher temperature than the melting point of zinc, it preserves the sponge structure even at high temperatures. A zinc oxide shell covering the fused zinc network is formed, generally preserving the metallic zinc bridges and powder particle cores within the shell. Some or all of the bridges may be partially or entirely converted to zinc oxide, but the physical bridges are not destroyed. Within the zinc oxide shell, the metallic zinc may melt without altering the morphology of the sponge, while potentially further increasing the strength of the structure and the fusing bridges. Any heating conditions that form the zinc oxide may be used. Example conditions include, but are not limited to, heating in air at 420 to 650, 700° C., at least greater than the melting point of the zinc, or at least 150° C. greater than the melting point of the zinc for at least 30 minutes.

Next, the sponge is returned to the inert atmosphere at a temperature at or above the melting point of the metal, for example 420 to 650, 700° C., at least greater than the melting point of the zinc, or at least 150° C. greater than the melting point of the zinc for 30 min or longer. This third heating step can further improve the strength and interconnectivity of the sponge by terminating additional oxide formation and further fusing the metal core of the sponge backbone, while the shape is protected by the oxide formed on the surfaces in the previous step. The switch back to an inert atmosphere halts further conversion to zinc oxide, to maintain a high amount of zinc in the core.

Optionally, the zinc oxide is then electrochemically reduced back to zinc to form a zinc metal sponge. This sponge contains the interpenetrating zinc and void space networks. The reduction may take place after the electrode is placed in the device, such as a battery, for which it is intended. Any electrochemical conditions that reduce the zinc oxide may be used. It may be done, for example, by applying a negative voltage to the oxidized sponge until the open-circuit potential vs. zinc is less than 5 mV. As above, the fusing bridges are generally preserved and converted back to metallic zinc. Some amount of zinc oxide may be present on the surfaces of the zinc network, as some zinc will oxidize even at room temperature.

This structure differs from one made by a single heating step of heating a dried emulsion under vacuum at a high temperature above the melting point of zinc. Such heating would rapidly form a shell of zinc oxide on each individual zinc particle before metallic zinc bridges could form to fuse the particles together. Lacking these bridges, such a structure is highly fragile and may have less electrical interconnectedness than the presently disclosed structure.

The final electrode may be used in an electrochemical cell. Such a cell may comprise an anode current collector, an anode comprising the zinc sponge electrode in electrical contact with an anode current collector, an electrolyte filling the void space, a cathode, a cathode current collector, and a separator between the anode and the cathode. The electrochemical cell may be a zinc-air battery. The construction of such batteries is known in the art. When the anode of the cell is fully or partially discharged, zinc oxide and/or zinc oxyhydroxides may be formed on the surface of the zinc network.

Other possible applications include the use of the zinc sponges in a variety of battery systems containing zinc as the negative electrode. Full-cell batteries (e.g., silver-zinc, nickel-zinc, zinc-carbon, zinc-air, etc.) can be prepared without modification of the fabrication procedure of the zinc sponges described herein, with or without electrolyte additives. The full-cell batteries described herein may utilize a nylon screw cap as the cell holder. Alternatives to this include any cell holder that contains zinc as an electrode component. Other alternatives include fabrication procedures designed to yield 3D, through-connected zinc structures, in an effort to produce porous zinc monoliths with uniform current distribution as a means to suppress dendrite formation, enhance cyclability, and/or increase zinc utilization in primary or secondary zinc-containing batteries.

The development of zinc-containing batteries capable of high-power operation and enhanced rechargeability requires a redesign of the architecture of the zinc electrode to provide high-surface-area electrochemical interfaces and to support improved current distribution to thereby suppress the overgrowth of electrodeposited Zn and deleterious dendrite formation. Traditional powdered-bed zinc composites predominantly used as negative electrodes in commercial zinc-containing batteries (e.g., zinc-air) suffer from low utilization (<60%) of theoretical specific capacity of Zn, high content of electrolyte additives, nonuniform current distribution, and limited rechargeability. The electrode disclosed herein describes the preparation of new zinc anodes that markedly improve on these drawbacks.

The formation of zinc powder emulsions with subsequent two-step sintering and electrochemical reduction steps yields robust, scalable, monolithic zinc sponges that are device-ready for a variety of zinc-containing batteries. The resultant zinc sponge comprises two interpenetrating, co-continuous networks of zinc metal and void, which improves current distribution throughout the structure of the electrode. This feature, inherent to the 3D architecture of the anode, hinders the formation of concentration gradients that would otherwise lead to disproportionate reaction centers that encourage growth of dendrites that inevitably cause battery shortage. The primary zinc-air battery used in the example below utilizes >20% more zinc than commercial powdered-bed zinc anode composites thereby providing higher specific energy, another feature expected from a metallic network of improved current distribution. In addition, a highly porous network co-continuous with the network of zinc metal allows for confined volume elements with high ratios of surface-to-electrolyte-volume that promote faster saturation of zincate upon discharge and more rapid dehydration to ZnO, thereby minimizing shape change. This notion, coupled with the dendrite suppression resulting from improved current distribution allows for rechargeability not seen with the Zn anodes in commercial zinc-air batteries.

The following examples are given to illustrate specific applications. These specific examples are not intended to limit the scope of the disclosure in this application.

Example 1

Figure 1:
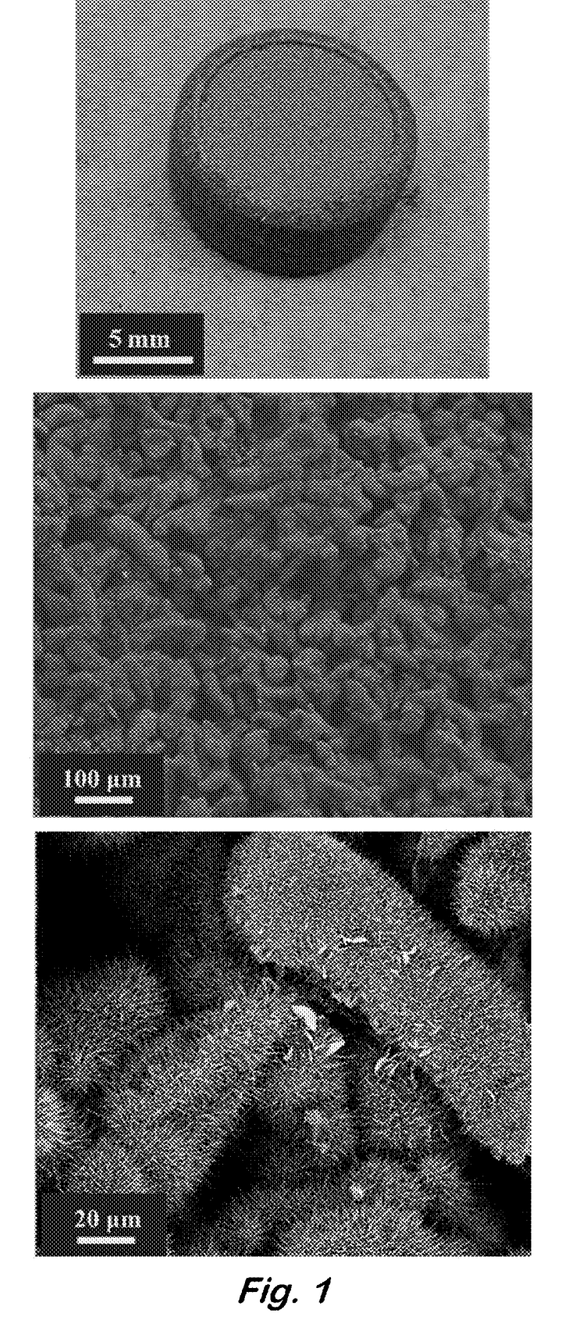
FIG. 1 shows a photograph (top) and scanning electron micrographs (middle and bottom) of a 3D zinc sponge after heating in argon and air, showing the fused, through-connected porous network of the monolith and the surface structure of the individual particles within the sponge.

Fabrication of monolithic zinc sponges—A typical preparation of zinc sponge electrodes begins with the formation of an emulsion of zinc powder in water and decane. In a small beaker or scintillation vial, 6.0 g of zinc powder that also contains 300-ppm indium and 285-ppm bismuth, as purchased from Grillo-Werke AG, was added. The indium and bismuth additives are necessary to lower the overpotential for hydrogen evolution in alkaline electrolytes, while eliminating the need for toxic additives such as lead and mercury (Glaeser, U.S. Pat. No. 5,240,793). Water (1.027 mL) and decane (2.282 mL) were added along with an emulsifier, sodium dodecyl sulfate (6.3 mg) and emulsion stabilizer, carboxymethylcellulose (0.253 g). The use of these ingredients in the formation of zinc emulsions that are subsequently used to make zinc electrodes has been described previously (Drillet et al., "Development of a Novel Zinc/Air Fuel Cell with a Zn Foam Anode, a PVA/KOH Membrane, and a $MnO_2$/SiOC-based Air Cathode" ECS Trans. 2010, 28, 13-24). The mixture was stirred rapidly at a rate of 1,200 rpm for >15 min to insure complete uptake of zinc into the emulsion. The freely flowing, yet viscous emulsion was poured into cylindrical, polyethylene molds and allowed to air-dry overnight. The molds used in this example were 1.15-cm in diameter and could yield zinc sponges from 1-4 mm thick; however, this procedure is scalable to other sizes and shapes. After 16-24 hours of drying, the mold was inverted to release the zinc monoliths, which were fragile at this stage. To strengthen the zinc sponges, samples were transferred to a tube furnace and heated under flowing argon at a positive ramp rate of 2° C. $\min^{-1}$ to a sintering temperature of 400° C. and held for 2 h. The argon flow was then removed and the tube was opened to ambient air and heated for a second step at 2° C. $\min^{-1}$ to 650° C. and held for 2 h. This final step encapsulates the surface of the sintered zinc particles with a shell of ZnO needles which is necessary to impart additional strengthening character to the zinc sponges. After 2 h the tube was allowed to cool without any rate control. The resultant monolith was characterized with scanning electron microscopy (SEM) as seen in FIG. 1.

Example 2

Figure 2:
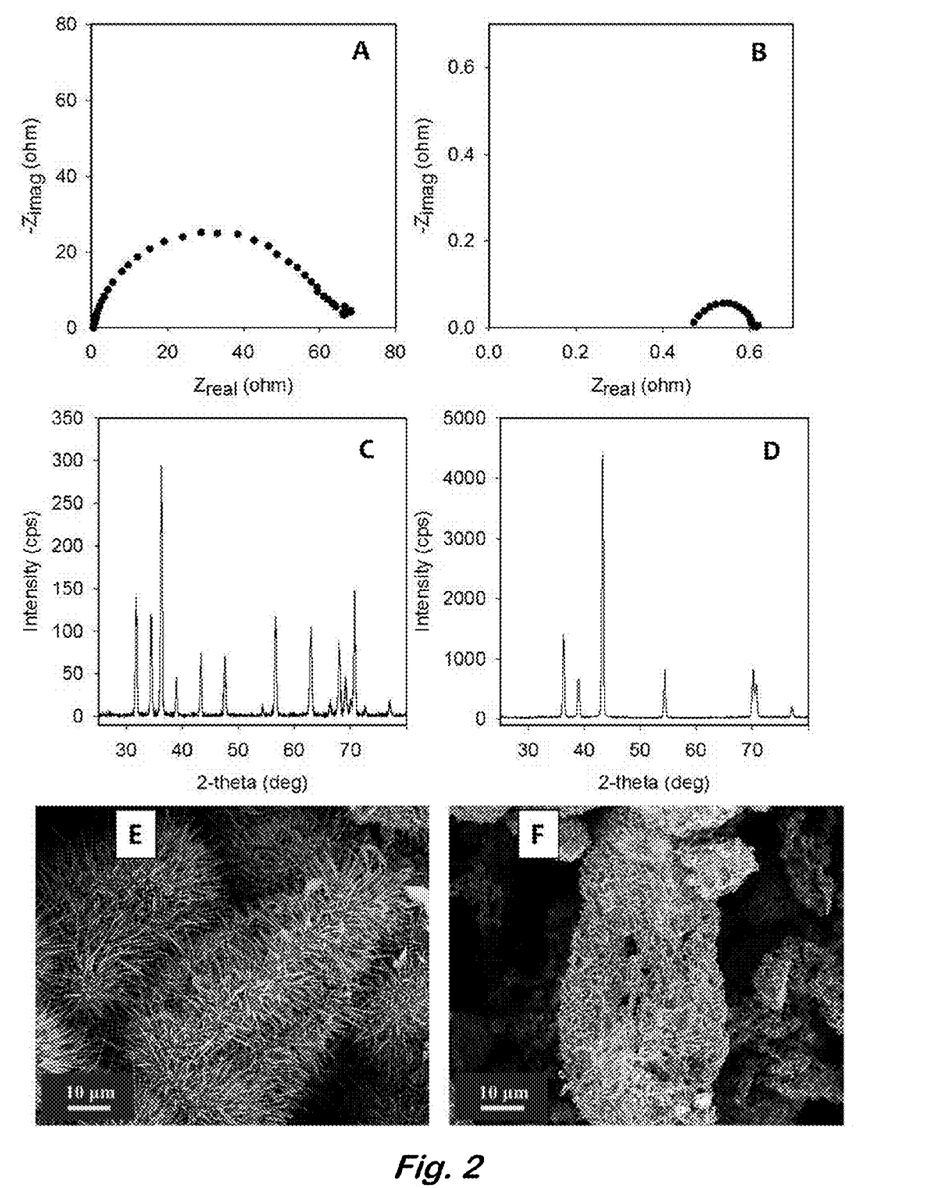
FIG. 2 shows a comparison of zinc sponges in the post-heated state (left: A,C,E) and after the electrochemical reduction step (right: B,D,F) as measured by (A,B) electrochemical impedance spectroscopy; (C,D) X-ray diffraction; and (E,F) scanning electron microscopy.

Zinc sponges as a negative electrode in zinc-air batteries—The intentional introduction of oxide to the zinc sponges enhances the mechanical integrity, allowing them to be routinely handled with decreased risk of fracture; however, a layer of oxide on the zinc lowers the initial capacity upon discharge and introduces contact resistance when assembling the zinc-containing cell (see Nyquist plots from electrochemical impedance spectroscopy (EIS) in FIG. 2A). In order to electrochemically reduce the ZnO coating, the sponge is used as part of the working electrode in a half-cell, three-electrode configuration with a Pt counter electrode and zinc quasi-reference electrode in 6 M KOH. A zinc sponge was placed in an envelope of tin-coated-copper mesh to form the working electrode. (Tin contacts were used because tin is galvanically compatible with zinc and corrosion of the electrode is suppressed that would otherwise be rampant with other current collectors (e.g., nickel, copper, etc.).) In a typical experimental sequence, the open-circuit potential (OCP) of the cell was measured versus a metallic zinc quasi-reference electrode, and then an initial EIS measurement was performed. The initial OCP typically exceeded 40 mV vs. Zn, and the real impedance (RCT) was much higher than that expected for metallic contact, consistent with the presence of a poorly conducting zinc oxide coating on the zinc sponge. Electrochemical reduction of the oxide-coated sponge to its metallic zinc counterpart was achieved by applying a constant potential of −50 mV for 30 min, followed by additional EIS and OCP measurements. This sequence was repeated until the open-circuit potential was stable at or near 0 mV, indicating complete reduction to zinc metal. The charge-transfer resistance decreased to less than 0.2 $\Omega cm^{-2}$ for the electroreduced zinc sponge, as compared to the post-heated zinc sponge, where resistance exceeded 60 $\Omega cm^{-2}$ (FIGS. 2A,B). Conversion of ZnO to Zn metal was confirmed using X-ray diffraction (Rigaku, FIGS. 2C, 2D), which showed a loss of the ZnO reflections, leaving only metallic zinc after electroreduction. In addition, after reduction there was no obvious loss in the porosity or mechanical strength of the zinc monoliths; however, a measurable mass loss was recorded, due to oxygen mass lost as ZnO is reduced to Zn as well as some corrosion of zinc to form soluble products that are lost to the alkaline electrolyte. Based on twelve control experiments, the average mass loss associated with this electrochemical reduction step is 23.9±3.4%. FIGS. 2E, 2F highlight the changing morphology after the reduction step, effectively removing the shell of zinc oxide associated with the as-prepared sponges.

Figure 3:
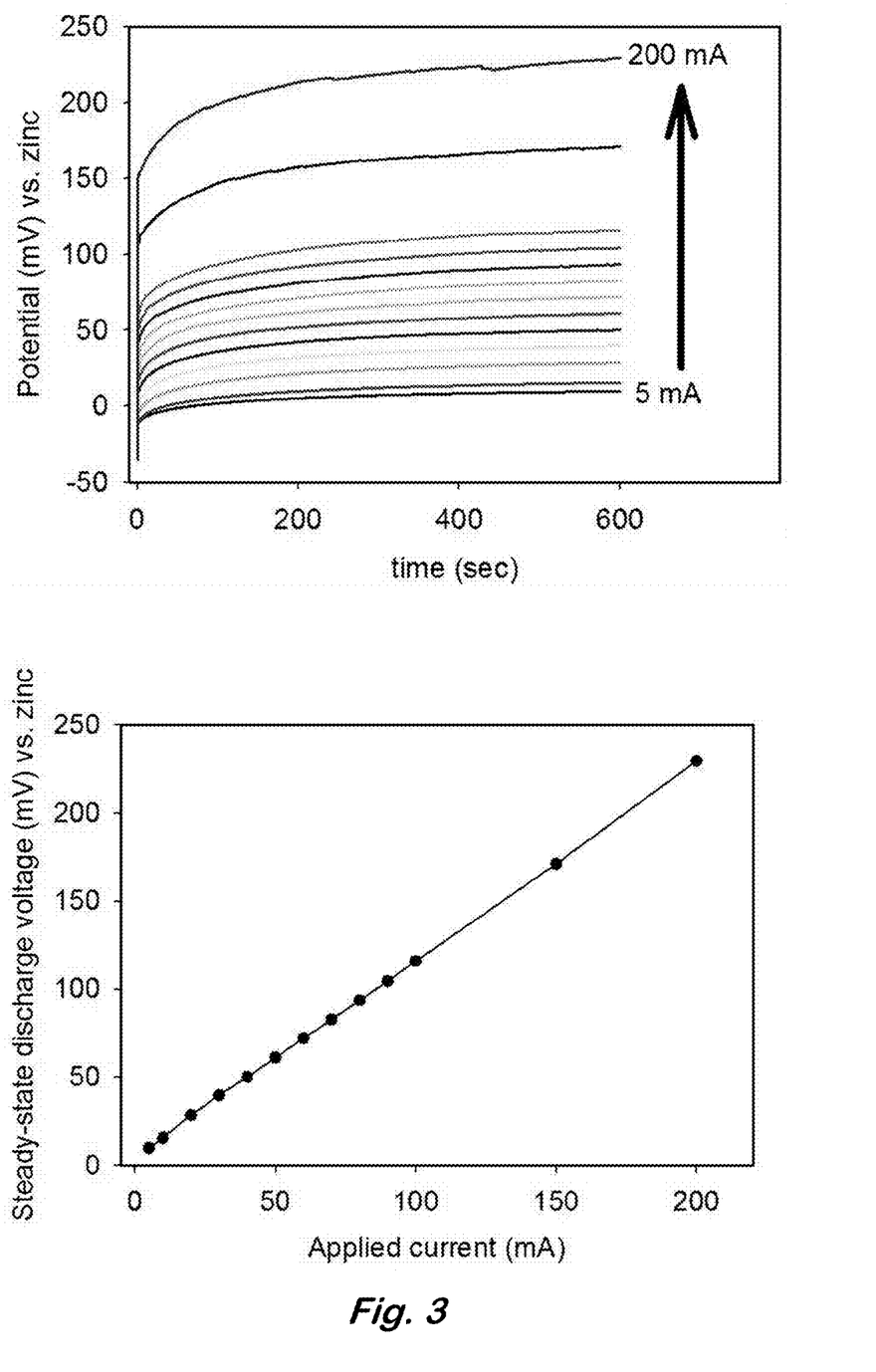
FIG. 3 shows (top) discharge potentials in a half-cell configuration at increasing applied currents, 5 mA-200 mA for 10-min increments and (bottom) linear dependence of the steady-state discharge voltage with increasing applied currents.

The reduction step described above successfully lowered the amount of zinc oxide present in the sponge, which would otherwise limit capacity and increase resistance when incorporated into a zinc-containing battery. The half-cell testing configuration provides a quality check on the impedance characteristics of the anode prior to use in full-cell batteries, but it can also be a useful tool to study the power capabilities of zinc sponges as anodes. For example, a zinc monolithic sponge (1.15-cm diameter; 3.5-mm thick) was attached to a tin current collector with LOCTITE® Hysol® 1C™ epoxy completely surrounding all components except for the face of the zinc sponge. A reducing voltage of −50 mV versus zinc was applied for 50 min followed by discharging (i.e., oxidizing) the zinc sponge at constant current (5 mA) for 10 min to measure the steady-state discharge voltage. This protocol was repeated with increasing applied currents as shown in FIG. 3. The galvanostatic experiments revealed a linear dependence of the steady-state discharge voltage on applied current. Even at an imposed current of 200 mA (193 mA $cm^{-2}$), the overpotential required for maintaining this current density was only 230 mV. The ability to maintain low overpotentials even at high load (current density) is an enabling characteristic of the zinc sponge architecture. Conventional zinc-containing batteries, including zinc-air, typically operate with up to a 500 mV drop with respect to open-circuit voltage (Linden, "Zinc/air cells" Handbook of Batteries. 1984, $2^{nd}$ Ed.).

Figure 4:
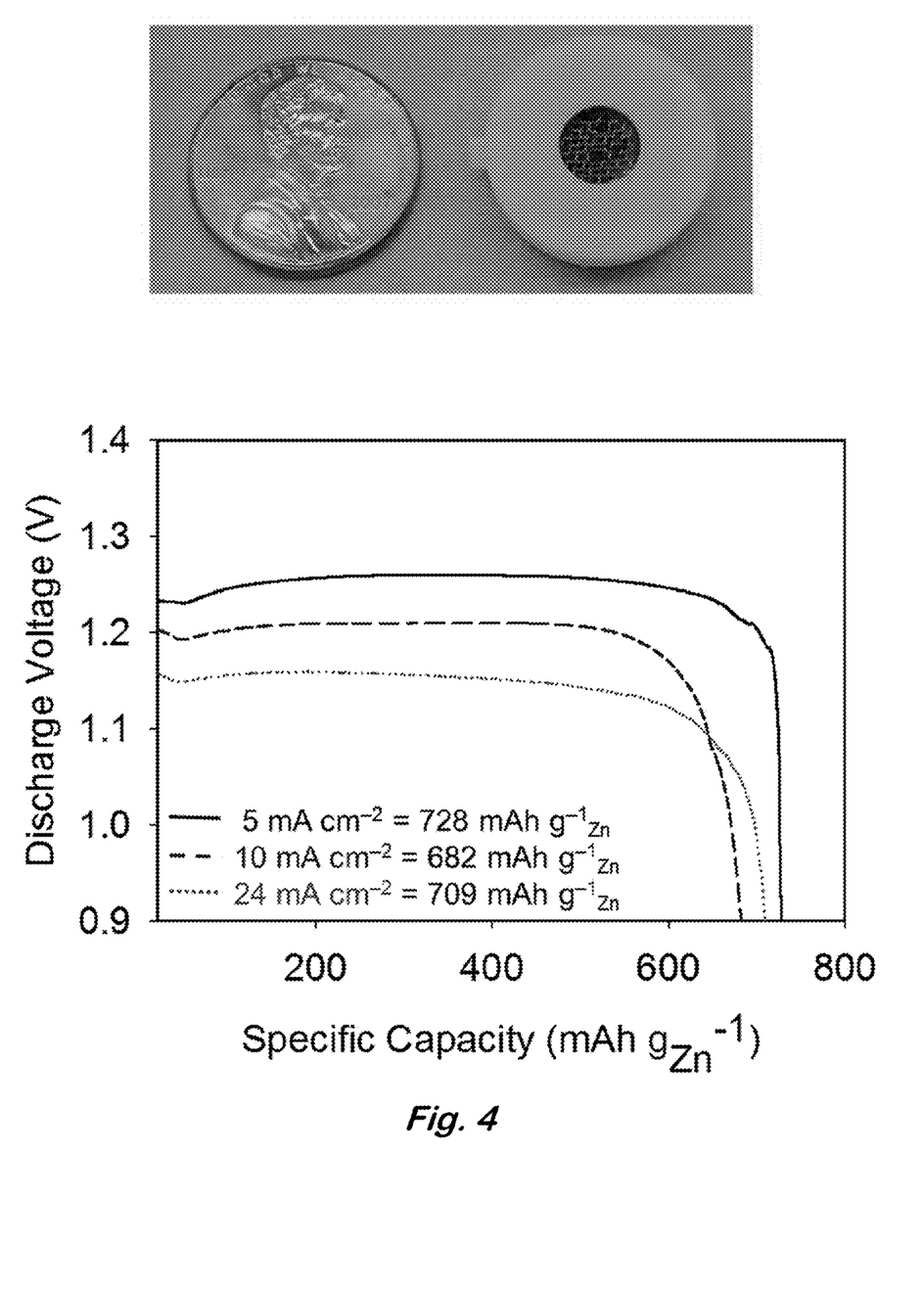
FIG. 4 shows (top) full-cell zinc-air battery demonstrations, prepared using the described zinc-sponge anodes and carbon/cryptomelane/Teflon® composite air-cathode and (bottom) discharge profiles of three zinc-air cells at discharge current densities of −5 mA cm$^{-2}$, −10 mA cm$^{-2}$, and −24 mA cm$^{-2}$.

Once the zinc sponge was fully reduced to $Zn^0$, it was ready to be used as a negative electrode in a full-cell battery. The prototype zinc-air cell used for preliminary testing is based on a 1.8-cm nylon screw cover (Hillman Group), which snaps together with a 6-mm hole on the top face, which serves as the air-breathing side of the cell. A platinum wire was attached to a tin current collector and used as the negative terminal during battery testing. Following the separate electrochemical reduction step, the zinc sponge, still infiltrated with a 6 M KOH, was submerged in a gel electrolyte synthesized from 6 g of polyacrylic acid dissolved in 100 mL of 6 M KOH. To prepare the full Zn-air cell, excess gel was dabbed away from the gel-dipped zinc sponge, leaving only a thin coating. The viscous gel electrolyte insures the zinc sponge remains fully infiltrated with liquid electrolyte while slowing the evaporation of solvent. The zinc sponge was placed on the tin current collector, and then topped with an aqueous-compatible separator with dimensions slightly larger than the diameter of the zinc sponge (1.15 cm). The positive electrode terminal comprises an air-cathode composite of Ketjen black carbon, cryptomelane, and Teflon® attached to a piece of nickel mesh, attached to a platinum wire lead. The results of typical zinc-air full cells utilizing these zinc sponge anodes are shown in FIG. 4. In these examples, all initial OCPs were measured above 1.4 V prior to discharging the full cells at −5.0, −10, and −24 mA $cm^{-2}$. The average discharge voltage for these cells was 1.25, 1.19, and 1.13 V, respectively, each with a cutoff voltage of 0.9 V. The corresponding specific capacity obtained at the −5, −10, and −24 mA cm$^{-2}$ discharges were 728, 682, and 709 mAh g$_{Zn}$$^{-1}$ with respective specific energy densities of 907, 834, and 816 Wh kg$_{Zn}$$^{-1}$ and corresponding zinc utilization for these cells of 89%, 83%, and 86%. These metrics are an improvement over standard commercial zinc-powder composite anodes, which generally only utilize 50-60% of the theoretical specific capacity of zinc (Zhang, "Fibrous zinc anodes for high power batteries." *J. Power Sources.* 2006, 163, 591).

Example 3

Figure 5:
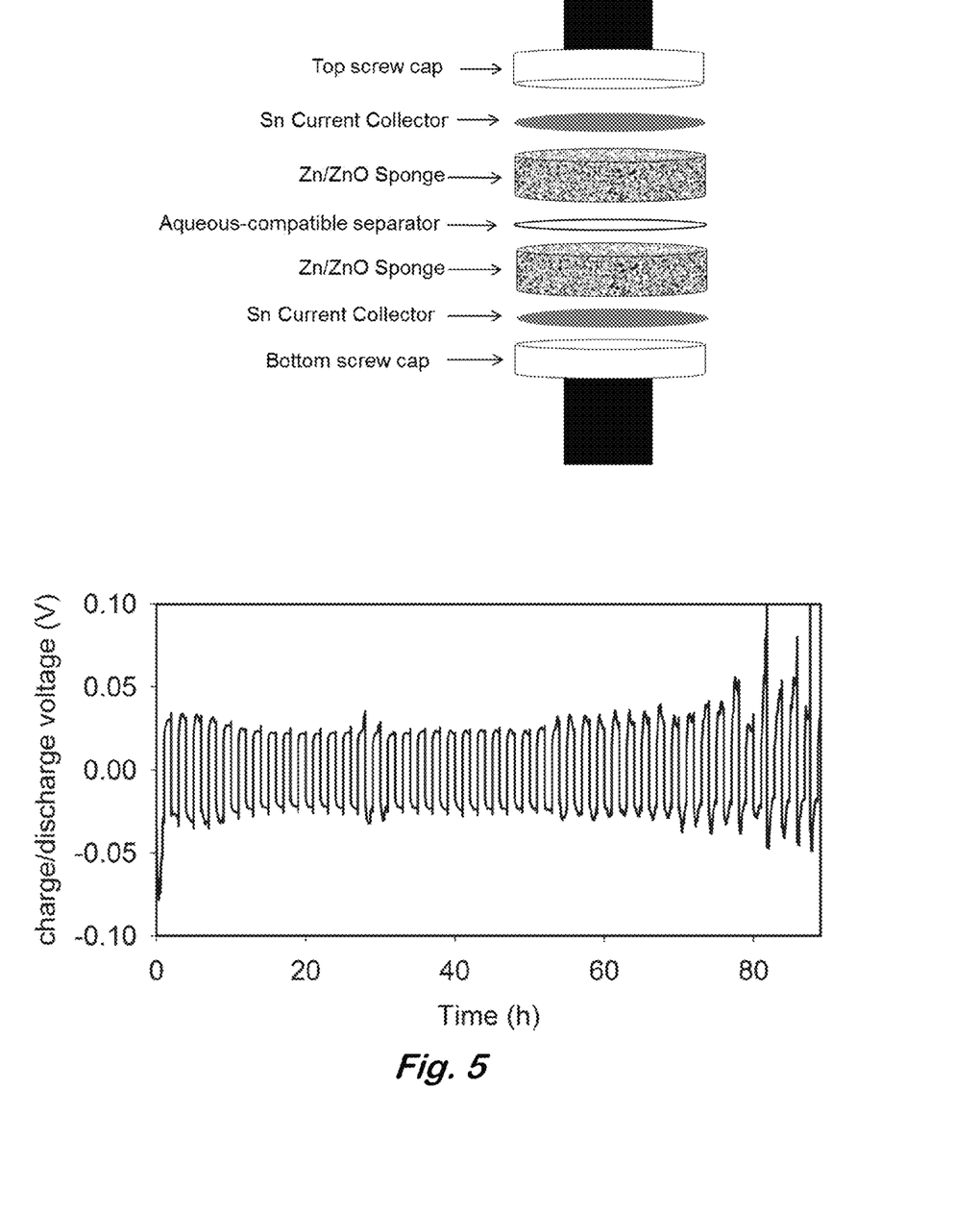
FIG. 5 shows (top) diagram of Zn/ZnO sponge symmetrical cell and (bottom) charge-discharge cycling data for up to 45 scans at an imposed load alternating between +24 mA cm$^{-2}$ and −24 mA cm$^{-2}$.
Figure 6:
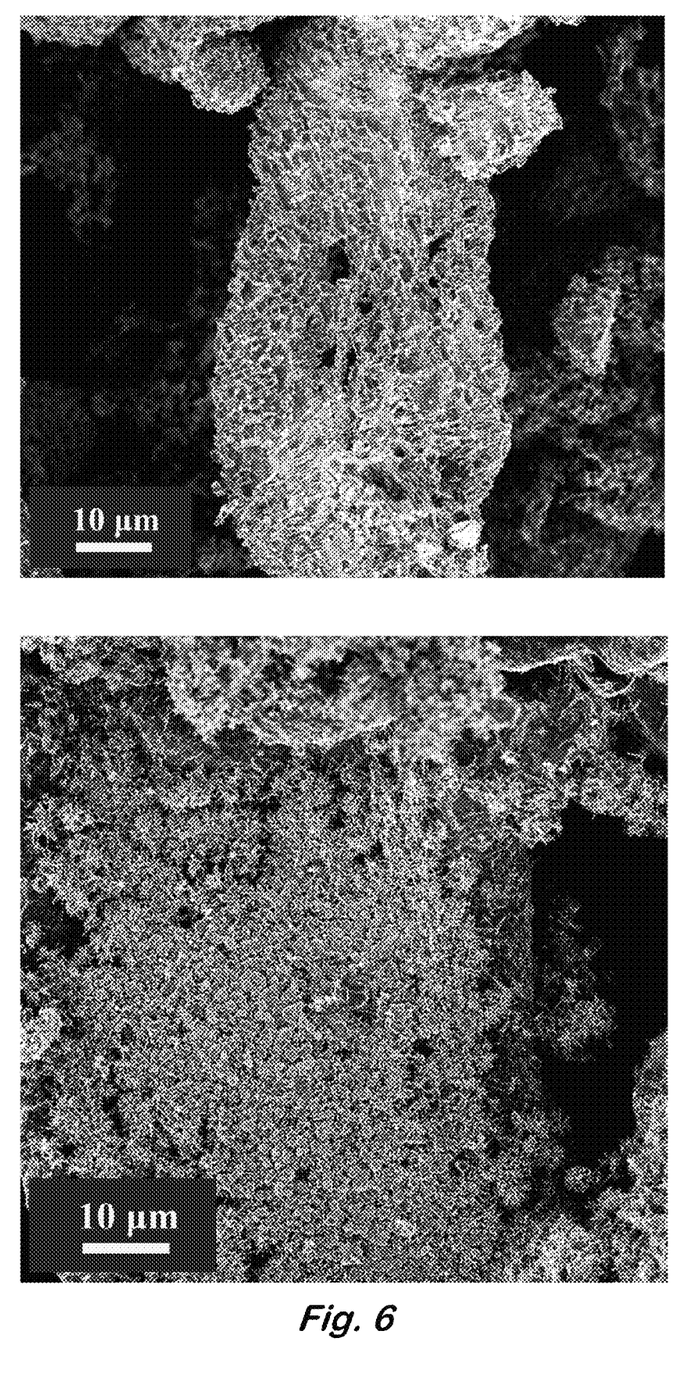
FIG. 6 shows (top) SEM of a single particle of a fully reduced, all-metal zinc sponge and (bottom) SEM demonstrating the formation of a compact ZnO coating over the surface of the Zn sponge after charge/discharge cycling for 45 scans at ±24 mA cm$^{-2}$; note that macroscale (>10 μm) dendrites are not observed.

Reversibility of zinc sponge anodes—In order to study the reversibility of the 3D zinc sponge in a battery configuration, without the requirement of having an optimized cathode (e.g., bifunctionally catalytic for the ORR or OER), a symmetrical electrochemical cell containing an all-metal Zn sponge versus a Zn/ZnO sponge separated by an aqueous-compatible separator was used. The Zn/ZnO sponge was prepared by electroreducing some of the ZnO present from the post-heated sponge by applying −50 mV versus zinc for 10-min increments. The EIS and the OCP were measured after each cycle. The reduction of this sponge was terminated when the RCT in the EIS fell below 0.5 Ωcm$^{-2}$, but the OCP remained greater than 30 mV vs. Zn, indicating high conductivity throughout the sponge network, yet ZnO remained. A second post-heated sponge was reduced at −50 mV versus Zn for 30-min increments as described in Example 2 until it was fully reduced to an all metal Zn sponge with an OCP very close to 0 mV vs. Zn. For the construction of the symmetrical cell, the negative electrode was an all-metal Zn sponge in electrical contact with a tin foil current collector and the positive electrode was the Zn/ZnO sponge electrode, also in contact with a tin foil current collector. Both sponge electrodes were pre-infiltrated with 6 M KOH and were separated by an aqueous-compatible separator (see FIG. 5). For the first step in the evaluation of the symmetrical cell, −24 mA cm$^{-2}$ was applied for 1 h to reduce some of the ZnO in the Zn/ZnO sponge, which is coupled to the oxidation of Zn in the opposing sponge. Then +24 mA cm$^{-2}$ was applied in the second step to initiate the reverse reactions. The full symmetrical cell was cycled at ±24 mA cm$^{-2}$ until one of the steps crossed the ±100 mV threshold. No electrical shorts were observed. For this example, the symmetrical cell was cycled for 45 charge-discharge cycles at a depth-of-discharge of −23%. For post-cycling analysis, the electrodes were removed from the cell, rinsed thoroughly, and dried in vacuo overnight. Scanning electron micrographs show that the sponges maintained their porosity post-cycling (FIG. 6). In addition, no obvious signs of shape change, dendrite formation, or nonuniform deposition were observed. The cycling of the zinc sponges resulted in a compact layer of zinc or zinc oxide on the surface of the particles of the monolith rather than flowery dendrites, demonstrating an increase in cyclability that is a result of this well-wired, well-plumbed zinc sponge architecture.

Example 4

Formation of zinc sponges fused to secondary metals—The emulsion described in Example 1 was poured into a plastic mold with a tin-coated copper mesh at the base of the mold and allowed to air-dry overnight. The molds used in this example were 2.5-cm×2.5-cm square and could yield zinc sponges from 1-10 mm thick. This procedure is scalable to other sizes and shapes. After 16-24 hours of drying, the mold was removed to release the zinc monoliths, which were fragile at this stage, sitting atop the tin-coated copper mesh. To strengthen the zinc sponges, samples were transferred to a tube furnace and heated under flowing argon at a positive ramp rate of 2° C. min$^{-1}$ to a sintering temperature of 409° C. and held for 2 h. The argon flow was then removed and the tube was opened to ambient air and heated for a second step at 2° C. min$^{-1}$ to 665° C. and held for 2 h. This final step encapsulated the surface of the sintered zinc particles with a shell of ZnO needles which increased the strength of the zinc sponges. After 2 h, the tube was allowed to cool without any rate control. A drawing of the mold, including the tin-coated copper mesh, and temperature profile is shown in FIG. 7.

Example 5

Figure 8:
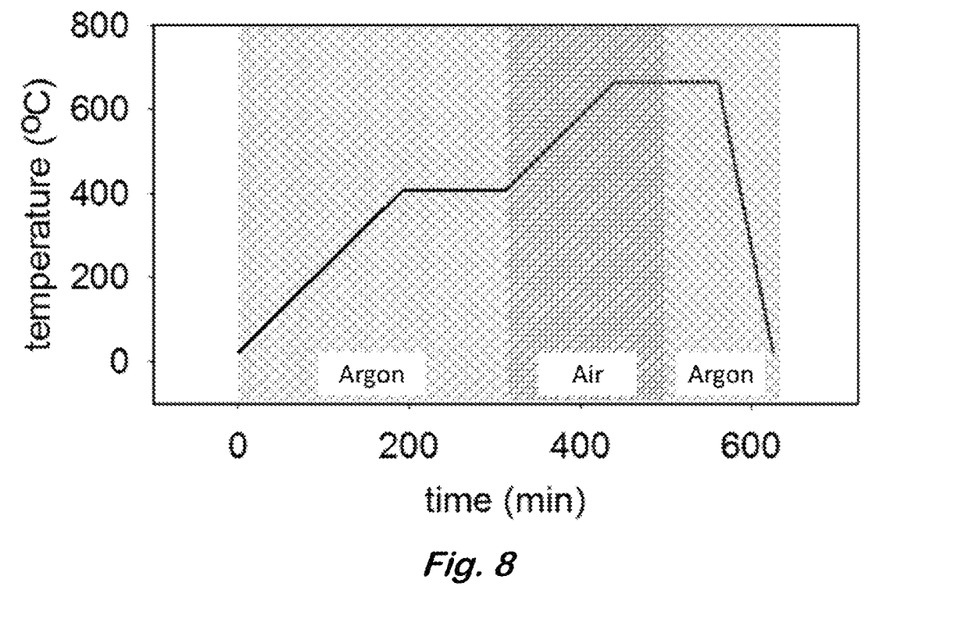
FIG. 8 shows a temperature program illustrating an example used to produce strengthened zinc electrodes, yielding zinc sponges fused in three-dimensions comprising a through-connected porous network of the monolith and the surface structure of the individual particles within the sponge.

Formation of zinc sponges from three-step thermal treatment—The emulsion described in Example 1 was poured into polyethylene molds and allowed to air-dry overnight. The molds used in this example were circular and 1.15 cm in diameter. After 16-24 hours of drying, the mold was removed to release the zinc monoliths, which were fragile at this stage. To strengthen the zinc sponges, samples were transferred to a tube furnace and heated under flowing argon at a positive ramp rate of 2° C. min$^{-1}$ to 409° C. and held for 2 h. The argon flow was then removed and the tube was opened to ambient air and heated for a second step at 2° C. min$^{-1}$ to 665° C. and held for 1 h. After 1 h, the argon atmosphere was returned to the tube and heated for an additional hour at 665° C. This final step terminated the formation of zinc oxide and further fused the interior Zn metal backbone. After 2 h the tube was allowed to cool without any rate control. A graph illustrating this temperature program is given in FIG. 8.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A method comprising:
   providing a mixture comprising a zinc powder and a liquid phase emulsion;
   drying the emulsion to form a sponge;
   sintering the sponge in an inert atmosphere to form a sintered sponge;
   heating the sintered sponge in an oxidizing atmosphere to form an oxidized sponge comprising zinc oxide on the surface of the oxidized sponge; and
   heating the oxidized sponge in an inert atmosphere at above the melting point of the zinc.

2. The method of claim 1, wherein the sintering is performed at at least two thirds of the melting point of the zinc and below the melting point of the zinc.

3. The method of claim 1, wherein heating the sintered sponge is performed at a temperature greater than the melting point of the zinc.

4. The method of claim 1, wherein heating the oxidized sponge is performed at a temperature greater than the melting point of the zinc.

5. The method of claim 1, wherein the sintering, heating the sintered sponge, and heating the oxidized sponge are each performed with dwell times of at least 30 minutes.

6. The method of claim 1, wherein the zinc powder or liquid phase comprises an additive that suppresses gas evolution and corrosion of the sponge.

7. The method of claim 6, wherein the additive comprises bismuth and indium.

8. The method of claim 1, wherein the liquid phase emulsion comprises water and decane.

9. The method of claim 1, wherein the emulsion comprises an emulsifier and an emulsion stabilizer.

10. The method of claim 9, wherein the emulsifier is sodium dodecyl sulfate and emulsion stabilizer is carboxymethylcellulose.

11. The method of claim 1, wherein the sintering is performed under argon at a peak temperature of 200-410° C.

12. The method of claim 1, wherein the heating is performed in air at a peak temperature greater than 420° C.

13. The method of claim 1, further comprising:
electrochemically reducing the zinc oxide to form a zinc metal sponge.

14. The method of claim 13, wherein the zinc oxide is reduced by applying a negative voltage to the oxidized sponge until the open-circuit potential vs. zinc is less than 5 mV.

15. A method comprising:
providing a mixture comprising a zinc powder and a liquid phase emulsion;
placing the mixture into a mold, wherein the mixture is in contact with a metal substrate;
drying the mixture to form a sponge;
removing the mold from the sponge and substrate;
sintering the sponge in an inert atmosphere to form a sintered sponge;
heating the sintered sponge in an oxidizing atmosphere to form an oxidized sponge comprising zinc oxide on the surface of the oxidized sponge; and
heating the oxidized sponge in an inert atmosphere at above the melting point of the zinc.

16. The method of claim 15, wherein the substrate is a metal mesh.

17. The method of claim 16, wherein the mesh has an average opening size that is less than the $d_{50}$ particle size of the zinc powder.

18. The method of claim 15, wherein the substrate is a metal foil.

19. The method of claim 15, wherein the substrate comprises tin or tin-coated copper.

20. The article made by the method of claim 15.

21. The method of claim 15, further comprising electrochemically reducing the zinc oxide to form a zinc metal sponge.

22. The article made by the method of claim 21.

* * * * *